Aug. 23, 1966    H. L. BLUST    3,268,317
APPARATUS FOR MANUFACTURING REED SWITCHES
Filed Dec. 26, 1962    3 Sheets-Sheet 1
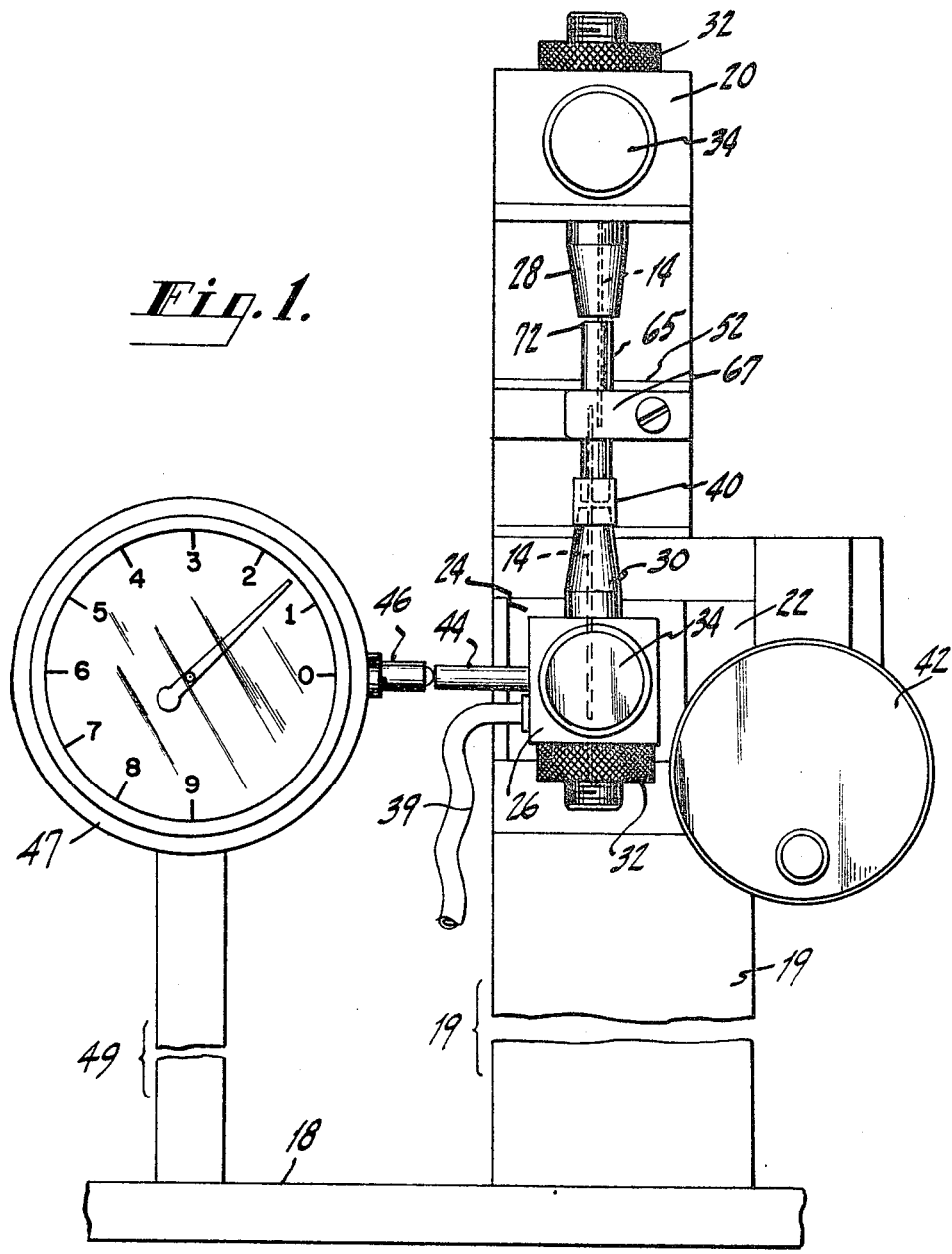
INVENTOR.
HENRY L. BLUST
BY
William A. Zalesak
ATTORNEY

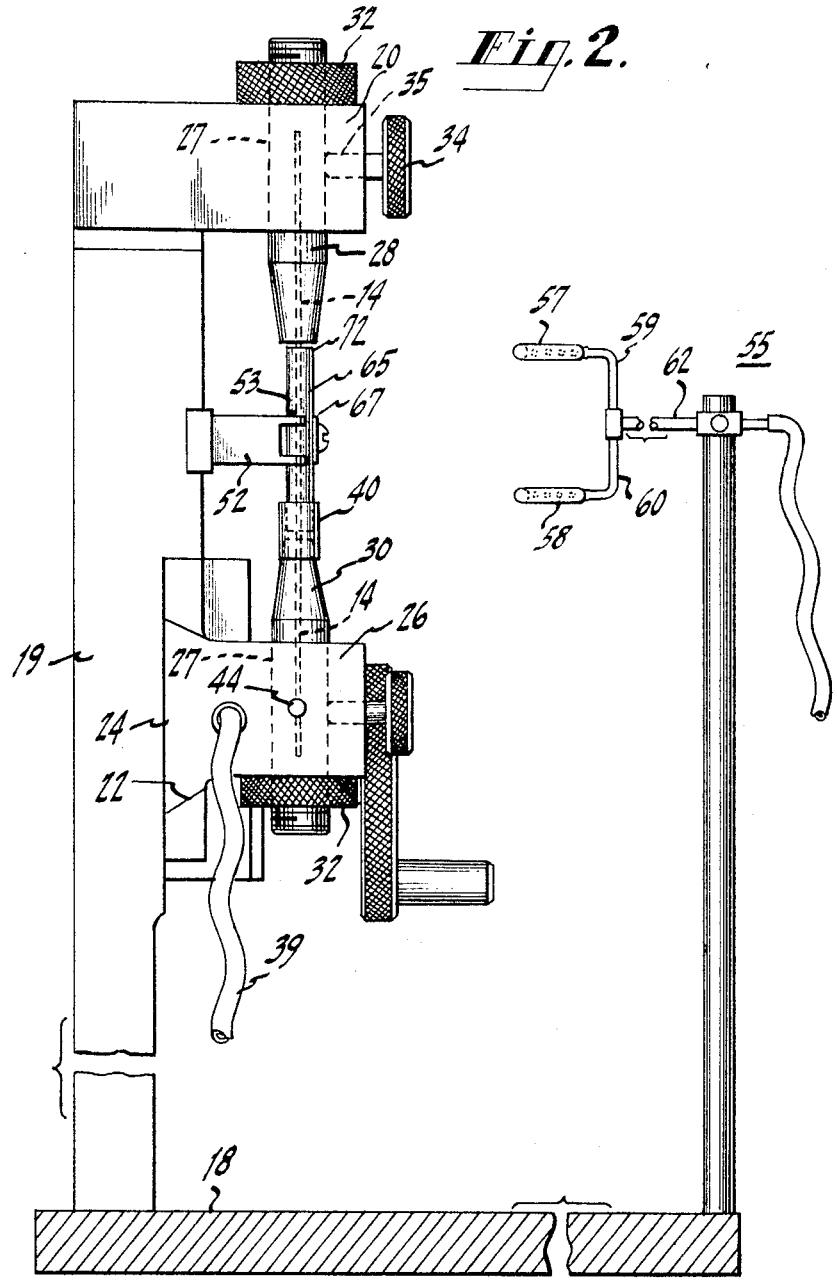

Aug. 23, 1966 H. L. BLUST 3,268,317
APPARATUS FOR MANUFACTURING REED SWITCHES
Filed Dec. 26, 1962 3 Sheets-Sheet 3
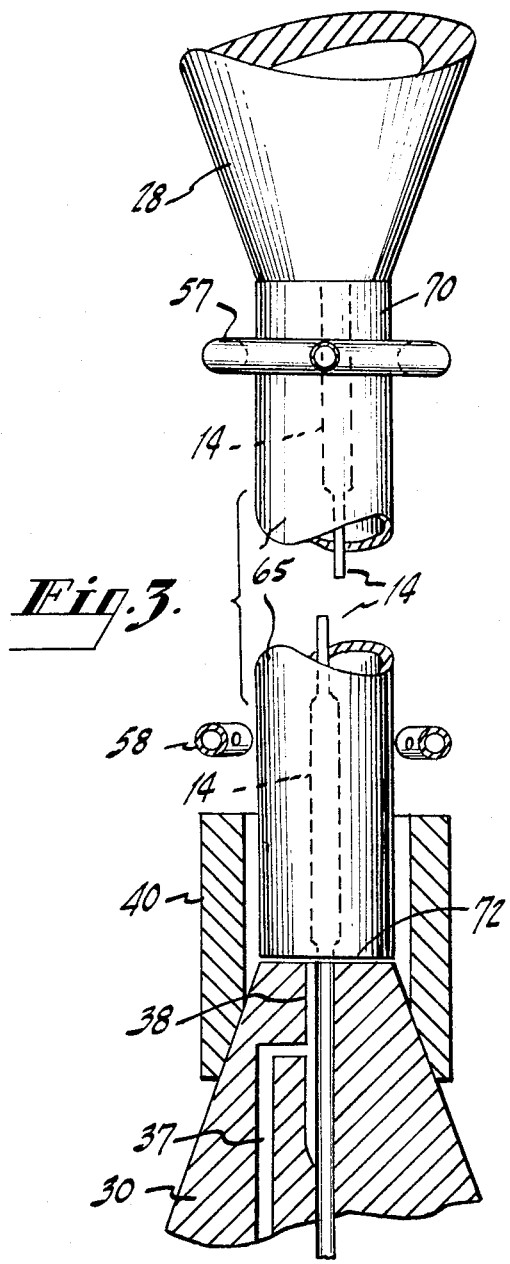
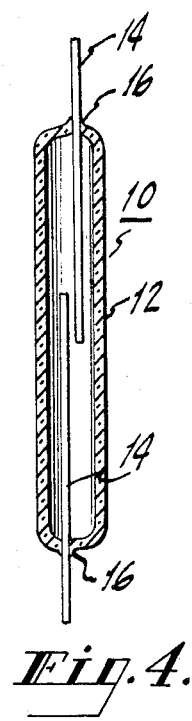
INVENTOR.
HENRY L. BLUST
BY William A. Zalesak
ATTORNEY United States Patent Office 3,268,317
Patented August 23, 1966

3,268,317
APPARATUS FOR MANUFACTURING
REED SWITCHES
Henry L. Blust, Lyndhurst, N.J., assignor to Radio Corporation of America, a corporation of Delaware
Filed Dec. 26, 1962, Ser. No. 247,008
5 Claims. (Cl. 65—138)

This invention relates to a method and apparatus for manufacturing glass reed switches, and particularly to a method and apparatus for the sealing of envelopes of reed switches.

A known type of glass reed switch comprises a pair of reeds of magnetic material projecting into a glass tube, the inner ends of the reeds overlapping slightly and the outer ends of the reeds projecting through and sealed vacuum tight through end walls of the glass tube or envelope to serve as terminals of the switch. A protective atmosphere is provided within the sealed envelope, such atmosphere being either neutral, such as nitrogen, or reducing, such as hydrogen. A reducing atmosphere is preferred since it tends to prevent oxidation of the inner ends of the reeds during operation of the switch, hence prolonging the life of the switch. Such a switch is operated by applying a magnetic field thereto of a strength sufficient to cause the overlapping portions of the magnetic reeds to contact one another.

One way of making glass reed switches comprises inserting reeds into a glass tube from opposite ends thereof until the inner ends of the reeds overlap with a desired gap therebetween. Prior to sealing the ends of the glass tube about the reeds, a gas is caused to pass through the glass tube to purge the atmospheric gas therein and to replace it with the purging gas. Preferably, the glass tube and the reeds are held in vertical position. The prior art sealing practice has been to pass the purging gas through the lower end of the glass tube, seal the top end of the glass tube onto the reed passing therethrough, and then, while the gas purge is trapped within the glass tube, seal the lower end of the glass tube onto the reed passing therethrough.

To save time in manufacture, it is desirable to fabricate the reed switches in the open air rather than, say, in a bell jar having a protective atmosphere, and to use gas sealing flames rather than, say, a resistance coil to provide the heat necessary to seal the glass tube about the reeds. Use of a bell jar requires an undesirably long time to replace the atmospheric gases with the protective gas, and use of a resistance coil requires an undesirably long period of time for the transfer of heat by radiation from the coil to the glass for sealing the ends of the glass tube.

A disadvantage of the use of a flowing gas purge in combination with gas sealing flames is that the products of combustion of the gas sealing flames in addition to the purge gas when hydrogen is used often enter through the lower end of the glass tube and are sealed within the glass envelope. The products of combustion, mostly water vapor, condense on the walls of the envelope upon cooling thereof and cause a reduction in the resistance across the inner terminals of the reed switch. Such reduction in resistance of the reed switch is undesirable, as known, since it interferes with the proper operation of the reed switch.

Therefore, an object of this invention is to provide improved apparatus and method for manufacturing reed switches.

A further object of this invention is to provide an advantageous apparatus and method for sealing portions of tubular glass envelopes in air using gas flames while preventing products of combustion from the gas flames from entering the glass envelopes.

Particularly, an object of this invention is to provide a means and method for fabricating a glass reed switch in the atmosphere using gas sealing flames to provide a switch having a dry protective atmosphere therein and a high resistance across the inner switch terminals when the switch is open.

For achieving these objects in accordance with this invention, apparatus is provided including a pair of reed clamps and a support for a glass tube. The support and clamps are arranged to hold the glass tube and the reeds therein in vertical properly spaced relation. A means are provided within the lower clamp for directing a purging gas into and around the lower end of the glass tube. For surrounding the lower end of the glass tube and a portion of the lower clamp, a tubular shield is provided. Gas burners are adapted to be positioned around each end of the glass tube for sealing these ends onto the portions of the reeds passing therethrough. One burner is adapted to be positioned adjacent the top end of the glass tube and the other burner is adapted to be positioned at a small distance from the lower end of the glass tube and above the shield.

The method of this invention includes positioning a glass tube and reeds in vertical spaced apart position, passing a purging gas into the lower end of the glass tube, sealing the top end of the tube about the reed passing therethrough, heating a portion of the glass tube adjacent the lower end of the tube while shielding said lower end from the products of combustion from the heating flames, and causing collapse of the wall of the lower portion of the tube onto and about the reed for sealing of the lower end of the glass tube onto the lower reed.

In the drawings:

FIG. 1 is a front elevation of the apparatus of this invention with the reed switch parts mounted on the apparatus but with the burner assembly removed for greater clarity;

FIG. 2 is a side elevation of the apparatus shown in FIG. 1 with the dial indicator gage removed for greater clarity;

FIG. 3 is an enlarged view of a portion of the apparatus shown in FIG. 1, portions thereof being broken away; and, FIG. 4 is a sectional view of a glass reed switch that may be made by the apparatus and method of this invention.

Referring first to FIG. 4, a reed switch 10 comprises a glass envelope 12 into which extend a pair of elongated electrical connectors or reeds 14 made of magnetic material, such as a gold plated nickel-iron alloy. The reeds 14 extend through glass-to-metal seals 16 at the ends of the envelope 12. The inner ends of the reeds 14 are close enough together so that a predetermined magnetic field when applied to the reed switch 10 by a surrounding coil (not shown) will cause the reeds to contact each other. Within the glass envelope 12 is a protective, non-corrosive atmosphere such as nitrogen or hydrogen, or the like, hydrogen being preferred.

Apparatus for making the reed switches 10 is shown in FIGS. 1 and 2. A stationary base 18 is provided on which a vertical standard 19 is fixed. A clamp 20 is fixed to vertical standard 19 at the upper portion thereof. A horizontally extending dovetail groove 22 is formed in the standard 19 below stationary clamp 20. A dovetail slide 24 slidably fits within dovetail groove 22 and includes as a part thereof a clamp 26. Clamps 20 and 26 have vertically extending openings 27 (FIG. 2) therethrough adapted to receive reed chucks 28 and 30. Chucks 28 and 30 have openings 38 (FIG. 3) therein adapted to snugly and accurately receive therein the reeds 14. One end of each chuck 28 and 30 is threaded and has a nut 32 thereon. The vertical position of chucks 28 and 30 may thus be controlled with respect to clamps 20 and 26 by means of adjustment of nuts 32.

Chucks 28 and 30 are removable from clamps 20 and 26 to facilitate loading of the reeds 14 therein, and may be clamped securely within clamps 20 and 26 by means of screws 34 threaded into openings 35 in the side of clamps 20 and 26.

Lower chuck 30 (FIG. 3) has a passageway 37 therethrough communicating at one end thereof with the opening 38 in chuck 30, and communicating at its other end with a passageway (not shown) in clamp 26 communicating in turn with a hose 39 (FIGS. 1 and 2) coupled to a source of purging gas (not shown). Mounted around the top end of lower chuck 30 is a tubular shield 40. The purpose of shield 40 will be described hereinafter.

Slide 24 and clamp 26, hence chuck 30 mounted thereon, are slidable within dovetail groove 22. A crank 42 is provided connected through suitable gearing means (not shown) to effect sliding motion of slide 24 back and forth within dovetail groove 22. A rod 44 (FIG. 1) is mounted on and extends horizontally outwardly from clamp 26. Rod 44 engages plunger 46 of dial indicator gage 47 mounted on support 49 for accurately indicating the position of clamp 26 within groove 22.

A glass tubing support 52 having a V-shape notch 53 along the edge thereof is mounted on standard 19 between clamps 20 and 26. A burner assembly 55 (FIG. 2) comprising a pair of identical annular burners 57 and 58 are held in parallel spaced position by piping 59 and 60 which supply gas to the two burners 57 and 58. Support means 62 is provided for moving the assembly 55 to the left, from the position as viewed in FIG. 2, to the position shown in FIG. 3 where the burners 57 and 58 are located around the glass tubing 65, and back to the position shown in FIG. 2 where the burners are completely to the right of the clamps 20 and 26 and the glass tubing support 52. A sector of each annular burner is omitted providing an opening in each burner by means of which the annular burners may be disposed about the glass tubing 65 for sealing the ends thereof.

As shown in FIGS. 1 and 2, a glass tubing 65 is held in the V-notch 53 of support 52 by spring clip 67. The outer ends of reeds 14 are individually held in chucks 28 and 30, the chucks being secured within clamps 20 and 26. The inner ends of the reeds overlap within the glass tubing 65 (FIG. 1). The glass tubing 65 is supported in the notch 53 of tubing support 52 in a position so that the lower end 72 of the tubing (see FIG. 3) is closely adjacent the upper end of lower chuck 30 and is within shield 40.

A method of operation of the apparatus described is as follows: at the beginning of the cycle the burner assembly 55 is positioned to the right as viewed in FIG. 2. Chucks 28 and 30 have been removed from clamps 20 and 26, and reeds 14 are inserted in the openings 38 therein. Openings 38 are provided with stops therein (not shown) wherein the length of the reeds extending outwardly of chucks 28 and 30 is fixed. Further, openings 38 are rectangular in cross section wherein the rectangular cross section reeds 14 are properly angularly oriented with respect to the chucks. A glass tubing 65 is clipped in place on support 52 by clip 67. Chucks 28 and 30 are then inserted into clamps 20 and 26 through the top and bottom thereof, respectively, and clamped in place by screws 34. Shield 40 is located over lower chuck 30 as the chuck 30 is inserted through the opening in clamp 26 and surrounds the lower end of glass tubing 65 as shown.

Crank 42 is then rotated to provide proper spacing between the reeds 14 within the glass tubing. The purging gas is then supplied through hose 39, through opening 38 in chuck 30 and through glass tubing 65. Glass tubing 65 does not fit tightly against the top end of chuck 30, hence some of the gas flows around the lower end of glass tubing 65 and upwardly and outwardly of shield 40.

The burner assembly 55 is moved to the left as viewed in FIG. 2 until the ends of the tubing 65 are centered in the individual burners 57 and 58, as shown in FIG. 3. Top burner 57 is positioned around and adjacent the top end 70 of tubing 65. Lower burner 58 is positioned slightly above the lower end 72 of glass tubing 65 and slightly above shield 40. Top burner 57 has a hotter flame than lower burner 58, hence the top end 70 of the glass tubing 65 is sealed about the reed 14 extending therethrough prior to the sealing of the lower end 72 of glass tubing 65. Prior to the sealing of the top end, however, the air within glass tubing 65 is purged by the gas flowing upwardly through lower chuck 30 and glass tubing 65. This gas is trapped within glass tubing 65 upon sealing the top end 70 thereof. Also, the purging gas flowing upwardly through tubing 65 prior to the sealing of the top end 70 of the tubing prevents the products of combustion from the top sealing burner 57 from entering and being trapped within the tubing.

At the lower end 72 of the glass tubing 65, flames from burner 58 start to soften the wall of the glass tubing at a point slightly above the lower end 72 thereof. During this time the purging gas continues to flow upwardly into the glass tubing 65 and around the lower end 72 thereof and upwardly through and outwardly of shield 40. In this manner the products of combustion from the flames of burner 58 are prevented from entering the lower end 72 of tubing 65. That is, shield 40 tends directly to prevent the products of combustion from reaching the open end of tubing 65, and more importantly, the flow of gas upwardly between the inside of shield 40 and the outside of tubing 65 prevents the flow of products of combustion downwardly to the end of the tubing. The flow of the purging gas upwardly through the shield 40 and along the outer wall of the tubulation directs the products of combustion away from the end 72 of tubing 65.

During the heating of the lower end 72 of tubing 65, the tubing wall collapses slowly about and onto the reed 14 extending therethrough. Simultaneously with this, the lower end 72 of the tubing 65 is drawn upwardly towards the heated region due to the force of cohesion of the softened and molten glass in the heated region. Before the lower end 72 rises above the top end of shield 40, however, the wall of tubing 65 has already collapsed onto and is hermetically sealed about reed 14. Thereafter, the lower end of the tubing collapses onto and adds to the prior made seal.

After the seals at both ends of the glass tubing are made, burners 57 and 58 are removed, the glass is allowed to set, and chucks 28 and 30 are removed from clamps 20 and 26. Reeds 14 slip out of chucks 28 and 30 as the chucks are removed from clamps 20 and 26, and the reeds 14 remain with the tubing 65 held in support 52. The finished reed switch 10 is then removed from support 52.

As mentioned, it is preferable that a hydrogen purging gas be used. During the sealing of the lower end 72 of the tubing 65, it is necessary that the flow of the gas purge be rapid enough to prevent hydrogen from burning within shield 40 and around the lower end of tubing 65. Also the flames from lower burners 58 should be reducing in order to prevent supplying oxygen to the region around the lower end 72 of tubing 65 which would promote burning of the hydrogen.

What is claimed is:

1. Apparatus for manufacturing reed switches which include a pair of reeds sealed through opposite ends of a glass envelope, said apparatus comprising means for holding a length of glass tubing having open ends and in vertical orientation, means adapted to hold each reed in a position extending through an end of said tubing and in spaced relation with the other of said reeds, annular baffle means for directing a purging gas through the lower end of said tubing, means for directing said purging gas to flow upwardly and along the outside of said lower end of said tubing, and gas burner means for sealing the ends of said tubing onto said reeds, said upward flow of said purging gas along the outside of said tubing preventing the products of combustion from said gas burner means from entering the lower end of said tubing.

2. Apparatus for manufacturing reed switches which include a pair of reeds sealed through opposite ends of a glass envelope, said apparatus comprising means for holding a glass tubing having open ends and in vertical orientation, means adapted to hold each reed in a position extending through an end of said tubing, means for moving said reeds with respect to one another to provide proper spacing therebetween, means for directing a purging gas through the lower end of said tubing, and annular baffle means adjacent the lower end of said tubing for directing said purging gas to flow upwardly and along the outside of said lower end, and gas burner means for sealing the ends of said tubing onto said reeds, said upward flow of said purging gas along the outside of said tubing preventing the products of combustion from said gas burner means from entering the lower end of said tubing.

3. Apparatus for manufacturing reed switches which include a pair of reeds sealed through opposite ends of a glass envelope, said apparatus comprising means for holding a glass tubing having open ends and in vertical orientation, means adapted to hold each reed in a position extending through an end of said tubing and in spaced relation with the other of said reeds, means for directing a purging gas through the lower end of said tubing, gas burner means for sealing the ends of said tubing onto said reeds, and annular baffle means disposed between the lower end of said tubing and the gas burner means at said lower end for directing said purging gas upwardly along the outside of said tubing for preventing the products of combustion from said lower burner means from entering said lower end of said tubing.

4. Apparatus for manufacturing reed switches which include a pair of reeds sealed through opposite ends of a glass envelope, said apparatus comprising means for holding a glass tubing having open ends and in vertical orientation, reed clamping means mounted above and below said tubing holding means, said clamping means each being adapted to hold a reed in a position extending through an open end of a tubing held by said tubing holding means and in spaced relation with the other of said reeds, a shield means disposed around the lower end of said held tubing a passage means through said lower clamp means for directing a flow of purging gas into said tubing and into said shielding means whereby said gas is directed upwardly along the outside of said tubing, and gas burner means for sealing each end of said tubing onto said reeds, said shielding means being disposed between the lower end of said tubing and the gas burner means for sealing said lower end.

5. Apparatus for manufacturing reed switches which include a pair of reeds sealed through opposite ends of a glass envelope, said apparatus comprising means for holding a glass tubing having open ends and in vertical orientation, reed clamping means mounted above and below said tubing holding means, said clamping means each being adapted to hold a reed in a position extending through an open end of a tubing held by said tubing holding means and in spaced relation with the other of said reeds, shielding means mounted on the lower of said clamp means and disposed around the lower end of said held tubing, a passage means through said lower clamp means for directing a flow of purging gas into said tubing and into said shielding means whereby said gas is directed upwardly along the outside of said tubing, and gas burner means for sealing each end of said tubing onto said reeds, said shielding means being disposed between the lower end of said tubing and the gas burner means for sealing said lower end.

References Cited by the Examiner
UNITED STATES PATENTS

| | | | |
|---|---|---|---|
| 2,215,641 | 9/1940 | Freeman | 65—155 XR |
| 2,455,317 | 11/1948 | Schneider | 65—155 |
| 2,506,414 | 5/1950 | Ellwood | 65—59 XR |
| 2,882,648 | 4/1959 | Hovgaard et al. | 65—32 |

DONALL H. SYLVESTER, *Primary Examiner.*

A. D. KELLOGG, *Assistant Examiner.*